United States Patent
Iwashima

(10) Patent No.: US 9,566,862 B2
(45) Date of Patent: Feb. 14, 2017

(54) INDICATING INSTRUMENT FOR VEHICLE

(71) Applicant: DENSO CORPORATION, Kariya, Aichi-pref. (JP)

(72) Inventor: Keiichi Iwashima, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 74 days.

(21) Appl. No.: 14/399,125

(22) PCT Filed: May 16, 2013

(86) PCT No.: PCT/JP2013/003122
§ 371 (c)(1),
(2) Date: Nov. 5, 2014

(87) PCT Pub. No.: WO2013/172031
PCT Pub. Date: Nov. 21, 2013

(65) Prior Publication Data
US 2015/0149025 A1    May 28, 2015

(30) Foreign Application Priority Data

May 17, 2012 (JP) .................................. 2012-113714
May 17, 2012 (JP) .................................. 2012-113715

(51) Int. Cl.
*G01D 11/16* (2006.01)
*B60K 35/00* (2006.01)
(Continued)

(52) U.S. Cl.
CPC .............. *B60K 35/00* (2013.01); *B60K 37/02* (2013.01); *G01D 13/22* (2013.01); *B60K 2350/408* (2013.01); *G01D 5/2451* (2013.01)

(58) Field of Classification Search
CPC .................................. G01D 11/00; G01D 11/16
(Continued)

(56) References Cited

U.S. PATENT DOCUMENTS 5,032,781 A    7/1991  Kronenberg
6,014,075 A    1/2000  Fujimori et al.
(Continued)

FOREIGN PATENT DOCUMENTS

CN    101034154 A    9/2007
JP    H07225246 A    8/1995
(Continued)

OTHER PUBLICATIONS

Office Action dated Dec. 16, 2015 issued in the corresponding CN application No. 2013 8002 5044.3 in Chinese with English translation.

(Continued)

*Primary Examiner* — Bentsu Ro
(74) *Attorney, Agent, or Firm* — Harness, Dickey & Pierce, P.L.C.

(57) ABSTRACT

An indicator indicates a vehicle state value in accordance with a rotational position between a zero position and a maximum position. A step motor rotationally drives the indicator on application of a drive signal in accordance with an electrical angle to a field winding. A control unit that controls the electrical angle of the drive signal applied to the field winding performs a leave-zero control operation which varies the electrical angle to rotate the indicator from the zero position to the maximum position and determines presence or absence of abnormal rotation of the indicator based on the electrical angle at the time of detecting the stopping of the indicator during the leave-zero control operation.

13 Claims, 14 Drawing Sheets

(51) Int. Cl.
  *G01D 13/22* (2006.01)
  *B60K 37/02* (2006.01)
  *G01D 5/245* (2006.01)

(58) Field of Classification Search
  USPC .......................... 318/685, 696; 116/286, 297
  See application file for complete search history.

(56) References Cited

U.S. PATENT DOCUMENTS

| | | | |
|---|---|---|---|
| 6,714,126 B2 * | 3/2004 | Wada ..................... | B60K 37/02 |
| | | | 116/286 |
| 2002/0117988 A1 | 8/2002 | Komura | |
| 2008/0007195 A1 | 1/2008 | Yamada | |
| 2010/0192836 A1 | 8/2010 | Nakane | |

FOREIGN PATENT DOCUMENTS

| | | | |
|---|---|---|---|
| JP | H07270193 A | 10/1995 | |
| JP | H0942996 A | 2/1997 | |
| JP | 2008005648 A | 1/2008 | |
| JP | 4175861 B2 | 11/2008 | |
| JP | 4760924 B2 | 8/2011 | |
| JP | 2012073171 A | 4/2012 | |

OTHER PUBLICATIONS

International Search Report and Written Opinion (in Japanese with English Translation) for PCT/JP2013/003122, mailed Jun. 25, 2013; ISA/JP.

* cited by examiner

INDICATING INSTRUMENT FOR VEHICLE

CROSS REFERENCE TO RELATED APPLICATIONS

This application is a U.S. National Phase Application under 35 U.S.C. 371 of International Application No. PCT/JP2013/003122 filed on May 16, 2013 and published in Japanese as WO 2013/172031 A1 on Nov. 21, 2013. This application is based on and claims the benefit of priority from Japanese Patent Applications No. 2012-113714 filed on May 17, 2012, and No. 2012-113715 filed on May 17, 2012. The entire disclosures of all of the above applications are incorporated herein by reference.

TECHNICAL FIELD

The present invention relates to an indicating instrument for a vehicle.

BACKGROUND ART

Conventionally, an indicating instrument for a vehicle has been known which rotationally drives an indicator with a step motor to indicate a vehicle state value in accordance with the rotational position of the indicator between a zero position and a maximum position. For example, Patent Literature 1 discloses an indicating instrument for a vehicle which applies drive signals in accordance with electrical angles to the field windings of a step motor to rotationally drive an indicator.

In the indicating instrument for a vehicle disclosed in Patent Literature 1, the indicator is stopped at a zero position using a stopper mechanism. In this manner, the electrical angles when the indicator is rotated to the zero position are automatically updated to allow the electrical angles of the drive signals to be precisely controlled.

PRIOR ART LITERATURE

Patent Literature

[Patent Literature 1] JP-B2-4760924

SUMMARY OF INVENTION

In the indicating instrument for a vehicle in which the indicator is rotationally driven by the step motor as described above, when abnormal rotation of the indicator occurs between the zero position and the maximum position, even though the electrical angles of the drive signals are precisely controlled, false indication of the vehicle state value occurs. The abnormal rotation of the indicator which causes such a problem is caused by a factor such as, e.g., a mechanical interference received by the indicator or the step motor. However, the indicating instrument for a vehicle disclosed in Patent Literature 1 cannot automatically determine the presence or absence of the abnormal rotation.

The present invention has been achieved in view of the problem described above and an object thereof is to provide an indicating instrument for a vehicle that automatically determines the presence or absence of abnormal rotation of an indicator.

According to a first aspect of the present disclosure, an indicating instrument for a vehicle includes an indicator that indicates a vehicle state value in accordance with a rotational position between a zero position and a maximum position, a step motor that has a field winding and rotationally drives the indicator on application of a drive signal in accordance with an electrical angle to the field winding, a control device that controls the electrical angle of the drive signal applied to the field winding and performs a leave-zero control operation which varies the electrical angle so as to rotate the indicator from the zero position toward the maximum position, a detection device that detects stopping of the indicator, and a determination device that determines the presence or absence of abnormal rotation of the indicator on the basis of the electrical angle when the detection device has detected the stopping of the indicator during the leave-zero control operation.

According to such a configuration, the leave-zero control operation is performed which varies the electrical angle of the drive signal so as to rotate the indicator from the zero position toward the maximum position. When abnormal rotation of the indicator occurs during such leave-zero control operation, the electrical angle detected on the basis of the stopping of the indicator due to the abnormal rotation is smaller than a normal electrical angle when the indicator has been able to rotate to the maximum position. Therefore, during the leave-zero control operation, on the basis of the electrical angle at the time of detecting the stopping of the indicator, the presence or absence of the abnormal rotation can automatically be determined.

According to a second aspect of the present disclosure, an indicating instrument for a vehicle includes an indicator that indicates a vehicle state value in accordance with a rotational position between a zero position and a maximum position, a step motor that has a field winding and rotationally drives the indicator on application of a drive signal in accordance with an electrical angle to the field winding, a stopper mechanism that stops the indicator at the zero position, a control device that controls the electrical angle of the drive signal applied to the field winding, performs a leave-zero control operation which varies the electrical angle so as to rotate the indicator from the zero position to the maximum position, and then performs a return-to-zero control operation which varies the electrical angle so as to rotate the indicator from the maximum position toward the zero position, a detection device that detects stopping of the indicator, and a determination device that determines the presence or absence of abnormal rotation of the indicator on the basis of the electrical angle when the detection device has detected the stopping of the indicator during the return-to-zero control operation.

According to such a configuration, after the leave-zero control operation which varies the electrical angle of the drive signal so as to rotate the indicator from the zero position to the maximum position, the return-to-zero control operation is performed which varies the electrical angle so as to rotate the indicator from the maximum position toward the zero position. Here, when the abnormal rotation of the indicator occurs during the return-to-zero control operation, the indicator is stopped by the abnormal rotation before being stopped by the stopper mechanism. As a result, the detected electrical angle is different from the normal electrical angle. Therefore, during the return-to-zero control operation, on the basis of the electrical angle at the time of detecting the stopping of the indicator, the presence or absence of the abnormal rotation can automatically be determined.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
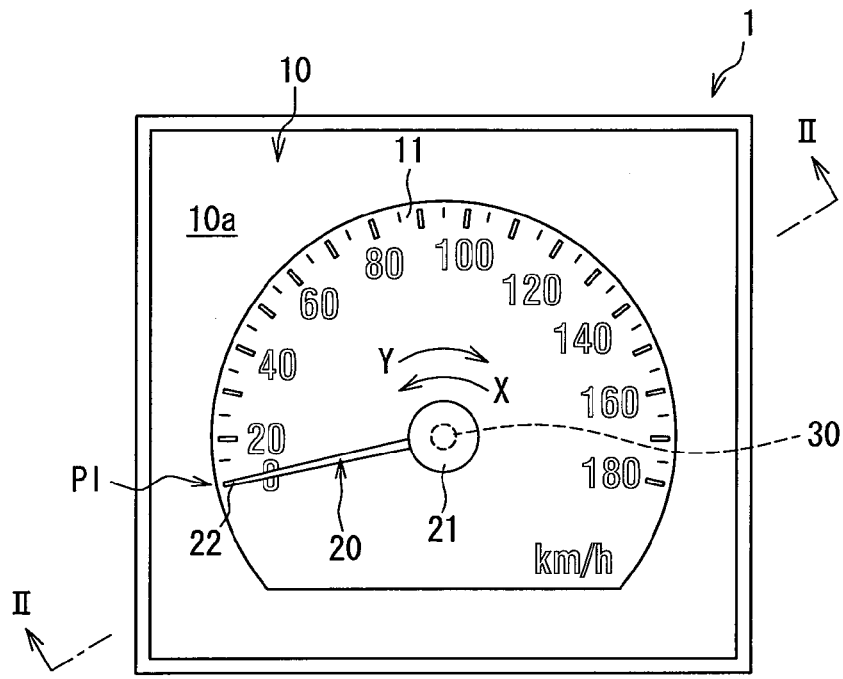
FIG. 1 is a front view showing an indicating instrument for a vehicle according to a first embodiment.

A plurality of embodiments of the present invention will be described below on the basis of the drawings. Note that, by designating the components corresponding to each other in the individual embodiments by the same reference numerals, a repeated description thereof may be omitted. When only a part of a configuration is described in each of the embodiments, to the other part of the configuration, the configuration of the other embodiment that has been described previously is applicable. Not only the configurations clearly shown in the description of the embodiments can be combined, but also the configurations of the plurality of embodiments, which are not clearly shown, can partially be combined unless the resulting combination presents a particular problem.

First Embodiment

As shown in FIG. 1, an indicating instrument 1 for vehicle (hereinafter referred to simply as "instrument 1") according to a first embodiment of the present invention is placed as a vehicle speed meter in front of a driver's seat in a vehicle.

(Configuration)

Figure 2:
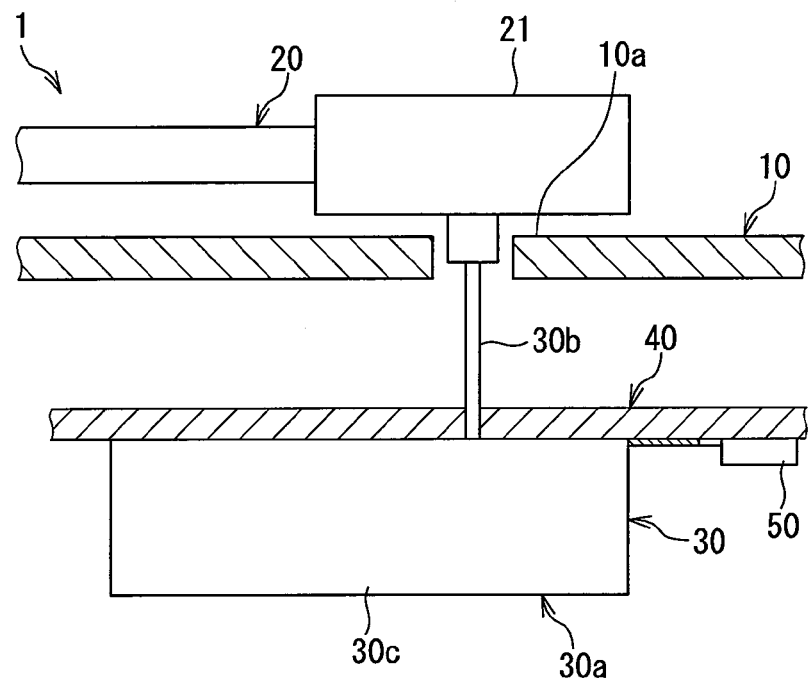
FIG. 2 is a cross-sectional view along the line II-II of FIG. 1.
Figure 3:
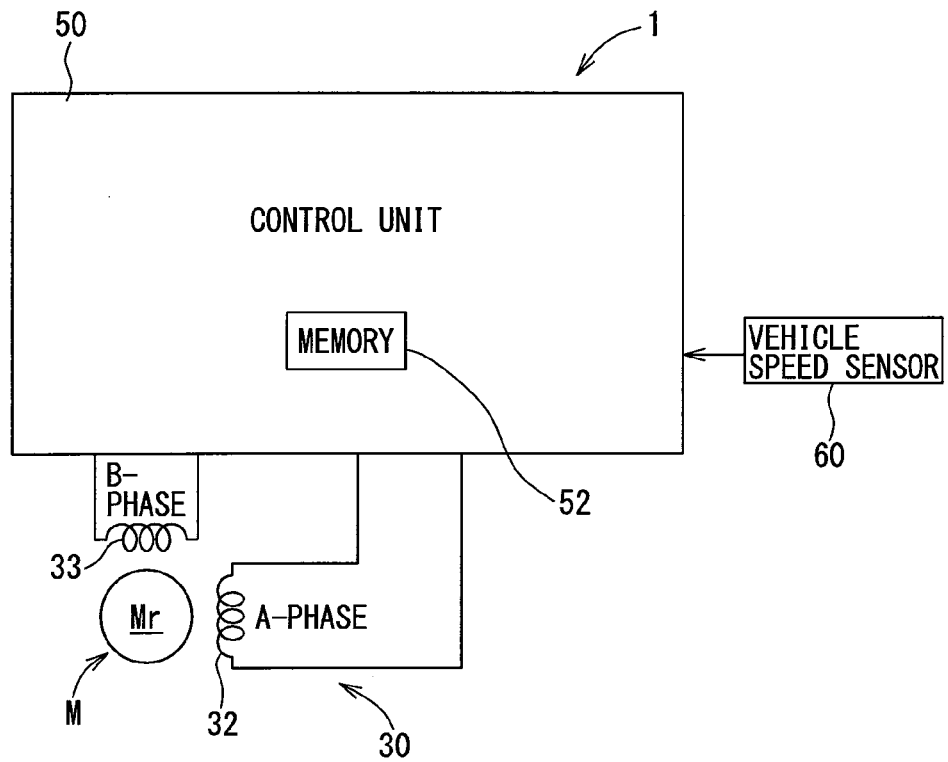
FIG. 3 is a block diagram showing an electric circuit configuration of the indicating instrument for a vehicle according to the first embodiment.

The configuration of the instrument 1 will be described below in detail. As shown in FIGS. 1 to 3, the instrument 1 includes a display plate 10, an indicator 20, a rotating internal mechanism 30, a substrate 40, and a control unit 50.

The display plate 10 shown in FIGS. 1 and 2 are placed with a display surface 10a thereof facing the driver's seat. The display plate 10 has a vehicle speed display unit 11 which displays, as a "vehicle state value", such a vehicle speed value as shown in FIG. 1. The vehicle speed display unit 11 displays a plurality of vehicle speed values from a zero value (0 km/h) as a lower-limit value thereof to an upper-limit value (180 km/h) thereof in an arc shape.

Figure 4:
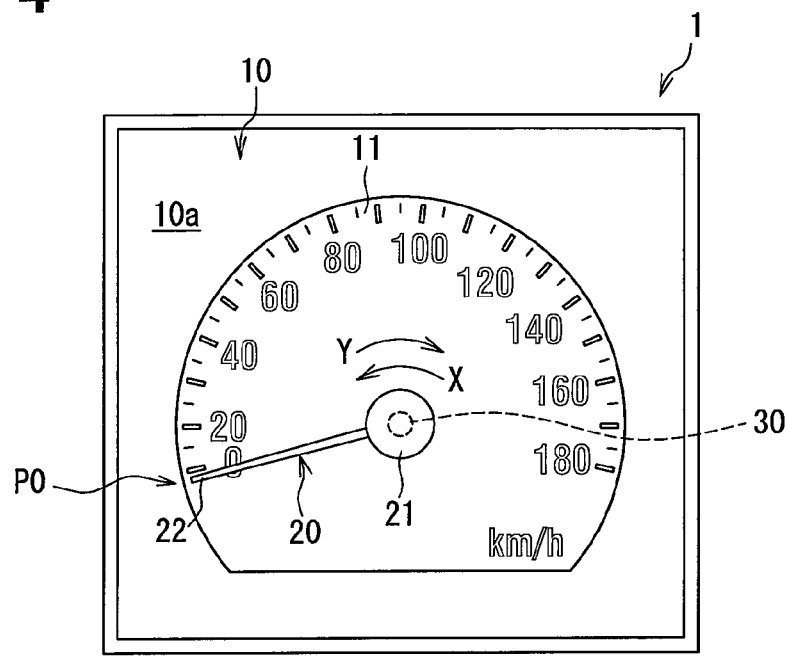
FIG. 4 is a front view of the indicating instrument for a vehicle showing an operating state different from that of FIG. 1.
Figure 5:
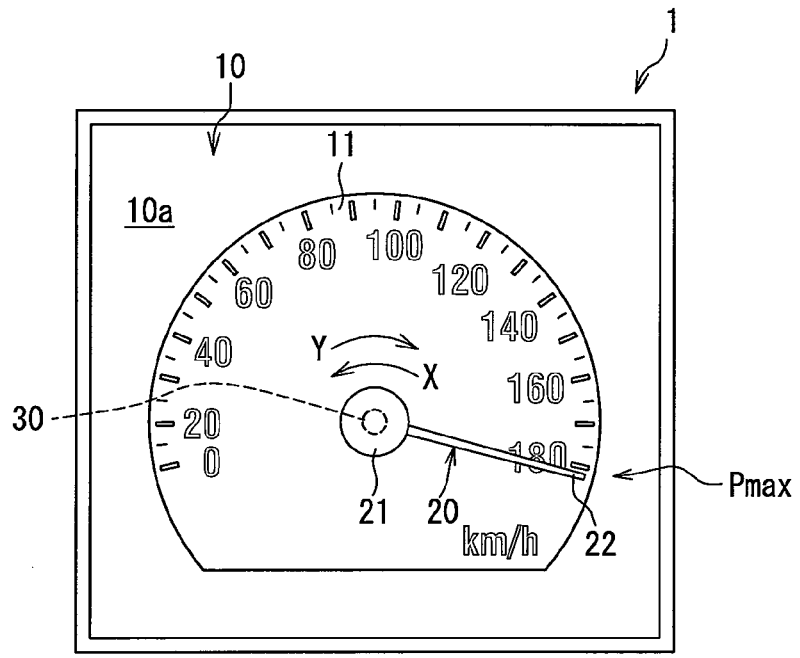
FIG. 5 is a front view of the indicating instrument for a vehicle showing an operating state different from that of FIG. 1.
Figure 6:
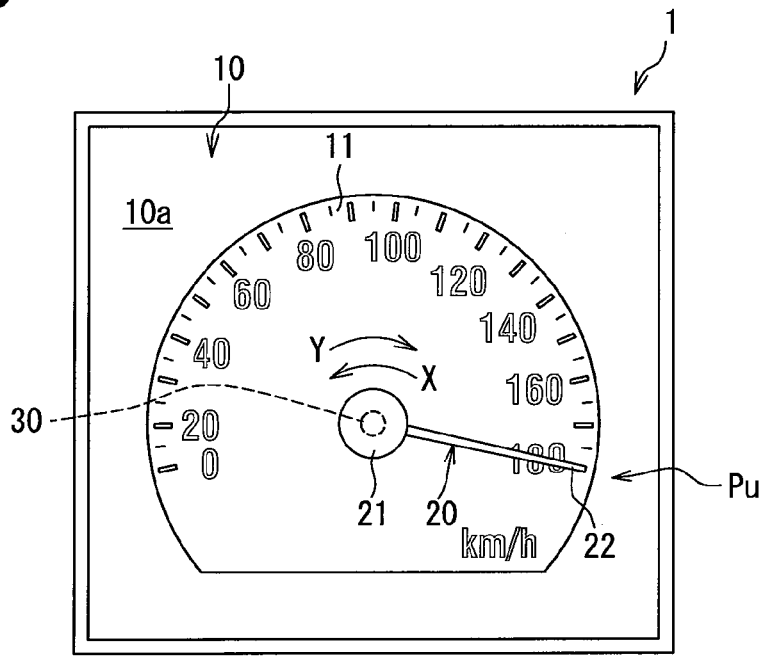
FIG. 6 is a front view of the indicating instrument for a vehicle showing an operating state different from that of FIG. 1.

Due to the coupling between a proximal end portion 21 and the rotating internal mechanism 30, the indicator 20 is capable of rotating in a return-to-zero direction X and a leave-zero direction Y along the display surface 10a. The indicator 20 indicates a value in accordance with a rotational position among the vehicle speed values displayed on the vehicle speed display unit 11 with a front end portion 22. Here, as shown in FIG. 4, the zero position P0 corresponding to a rotation limit in the return-to-zero direction X has been set in advance within a predetermined range (including also a lower-limit indicating position P1) extending from the lower-limit indicating position P1 indicating a zero value in the return-to-zero direction X, as shown in FIG. 1. On the other hand, as shown in FIG. 5, a maximum position Pmax corresponding to a rotation limit in the leave-zero direction Y has been set in advance within a predetermined range (including also an upper-limit indicating position Pu) extending from the upper-limit indicating position Pu indicating an upper-limit value in the leave-zero direction Y, as shown in FIG. 6.

The rotating internal mechanism 30 shown in FIG. 2 includes an internal mechanism main body 30a, an indicator shaft 30b, and a casing 30c. The internal mechanism main body 30a is fixed to the rear surface of the substrate 40 generally parallel with the display plate 10. The internal mechanism main body 30a has a two-phase step motor M, a deceleration gear mechanism G, and a stopper mechanism S (see FIG. 7) which are embedded in the casing 30c. The indicator shaft 30b extends through the substrate 40 and the display plate 10 to be coupled to the proximal end portion 21 of the indicator 20.

Figure 7:
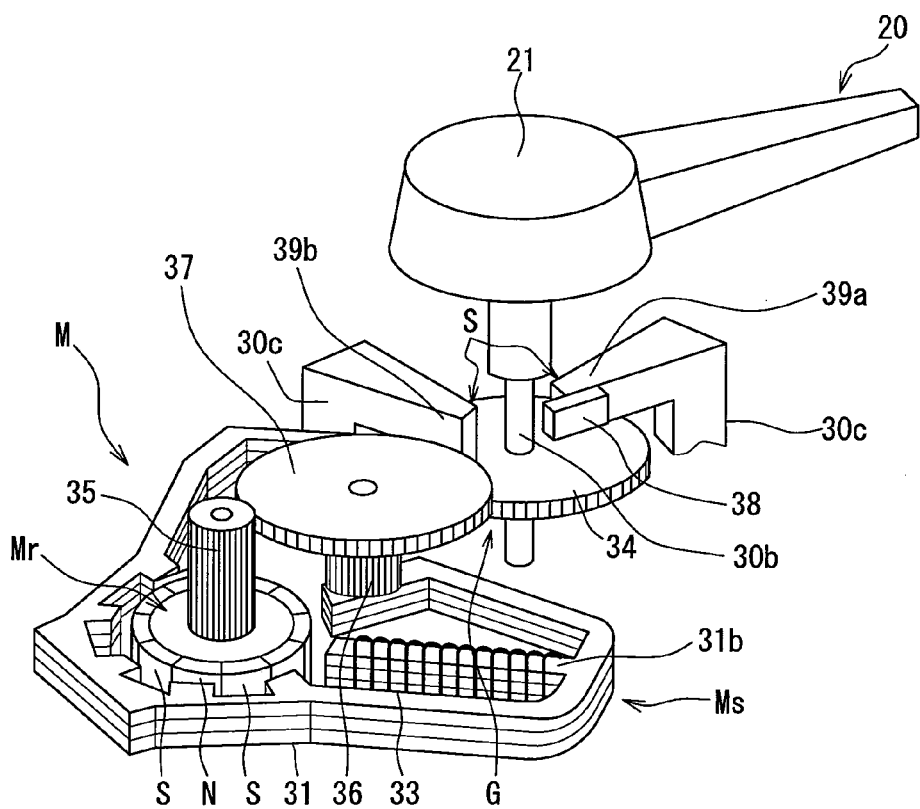
FIG. 7 is a perspective view showing a main portion of the indicating instrument for a vehicle according to the first embodiment.
Figure 8:
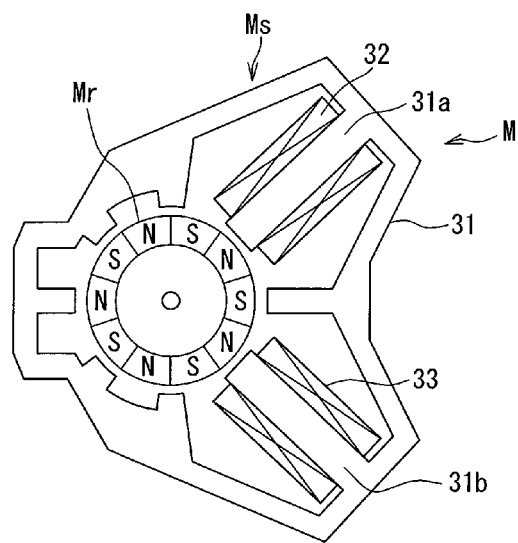
FIG. 8 is a plan view showing the main portion of the indicating instrument for a vehicle according to the first embodiment.

The step motor M shown in FIGS. 3, 7, and 8 is formed of a combination of a stator Ms and a magnet rotor Mr. The stator Ms has a yoke 31 and two-phase field windings 32 and 33. The yoke 31 forms a pair of magnetic poles 31a and 31b each showing a pole shape as in FIGS. 7 and 8. Around the magnetic pole 31a, an A-phase field winding 32 is wound while, around the magnetic pole 31b, a B-phase field winding 33 is wound. In the outer peripheral surface of the magnet rotor Mr spaced apart from each of the magnetic poles 31a and 31b, N- and S-poles as magnetic poles are alternately magnetized in the direction of rotation.

Figure 9:
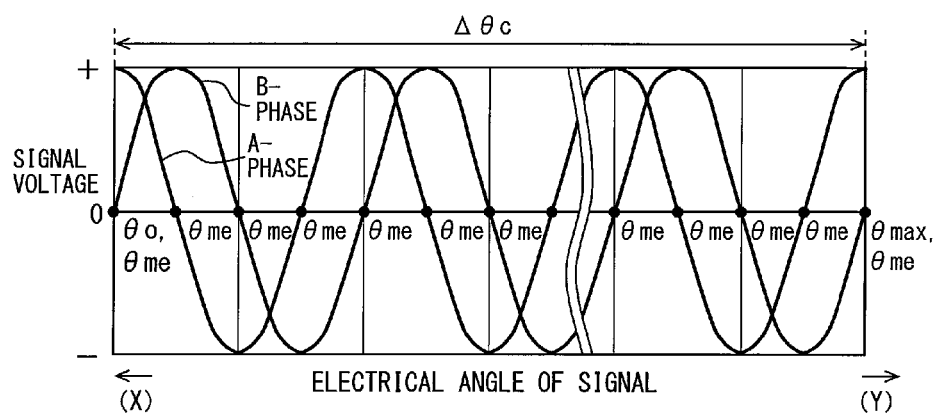
FIG. 9 is a graph for illustrating drive signals for the indicating instrument for a vehicle according to the first embodiment.

In the step motor M having such a configuration, the signal voltage of an A-phase drive signal applied to the A-phase field winding 32 alternates in the form of a cosine function in accordance with the electrical angle, as shown in FIG. 9. On the other hand, the signal voltage of a B-phase drive signal applied to the B-phase field winding 33 alternates in the form of a sine function in accordance with the electrical angle, as shown in FIG. 9. As a result of the application of the A-phase and B-phase drive signals having a 90-degree phase shift therebetween, an alternating magnetic flux generated by each of the field windings 32 and 33 passes through between the yoke 31 and the magnet rotor Mr to determine the rotational position of the rotor Mr.

The deceleration gear mechanism G shown in FIG. 7 has a plurality of gears 34, 35, 36, and 37. The output-stage gear 34 is coaxially coupled to the indicator shaft 30b. The input-stage gear 35 is coaxially coupled to the magnet rotor Mr. The intermediate gears 36 and 37 are coaxially coupled to each other to respectively mesh with the output-stage gear 34 and the input-stage gear 35.

With such a configuration, the deceleration gear mechanism G decelerates the rotation of the magnet rotor Mr and transmits the decelerated rotation to the indicator 20. As a result, the rotational position of the magnet rotor Mr is determined in accordance with the respective signal voltages of the A-phase and B-phase drive signals each in accordance with the electrical angle to thus determine the rotational position of the indicator 20. Note that, as shown in FIG. 9, in the present embodiment, a direction which reduces the electrical angle corresponds to the return-to-zero direction X of the indicator 20 and a direction which increases the electrical angle corresponds to the leave-zero direction Y of the indicator 20.

The stopper mechanism S shown in FIG. 7 has a rotating member 38 and stopper members 39a and 39b. The rotating member 38 is formed to be capable of integral rotation with the output-stage gear 34. The return-to-zero-operation stopper member 39a is formed in the casing 30c and placed on the rotational orbit of the rotating member 38 and on the corresponding side of the rotating member 38 in the return-to-zero direction X. The leave-zero stopper member 39b is formed in the casing 30c and placed on the rotational orbit of the rotating member 38 and on the corresponding side of the rotating member 38 in the leave-zero direction Y.

In such a configuration of the stopper mechanism S, when the rotating member 38 is engaged with the return-to-zero-operation stopper member 39a during the rotation of the indicator 20 in the return-to-zero direction X, the indicator 20 is stopped at the zero position P0. Accordingly, in the present embodiment, the electrical angle when the indicator 20 has been rotated to the zero position P0 at which the rotating member 38 is engaged with the return-to-zero-operation stopper member 39a is defined as the zero angle θ0 shown in FIG. 9. On the other hand, when the rotating member 38 is engaged with the leave-zero-operation stopper member 39b during the rotation of the indicator 20 in the leave-zero direction Y, the indicator 20 is stopped at the maximum position Pmax. Accordingly, in the present embodiment, the electrical angle when the indicator 20 has been rotated to the maximum position Pmax at which the rotating member 38 is engaged with the leave-zero-operation stopper member 39b is defined as the maximum angle θmax shown in FIG. 9. The zero angle θ0 and the maximum angle θmax each thus defined are set such that a fixed angle difference Δθc in accordance with the space between the zero position P0 and the maximum position Pmax is provided therebetween.

The control unit 50 shown in FIG. 2 is primarily composed of a microcomputer and mounted on the substrate 40.

As shown in FIG. 3, the control unit 50 has a memory 52. In the memory 52, a program for performing a predetermined process such as a checking process described later in detail has been stored in advance. Additionally, in the memory 52, various parameters such as the zero angle θ0 and the maximum angle θmax are stored as necessary.

The control unit 50 is electrically connected to each of the field windings 32 and 33. In a predetermined process such as a checking process, the control unit 50 provides a path switching function so as to measure induced voltages generated by the field windings 32 and 33, while controlling the A- and B-phase drive signals applied to the respective field windings 32 and 33. Specifically, the control unit 50 interrupts the electrical connection between a path for applying the drive signals and the one of the field windings 32 and 33 for which the signal voltage of the drive signal is to be controlled to a zero voltage (0 V), while electrically connecting a path for measuring the induced voltages to the winding. On the other hand, the control unit 50 electrically connects the path for applying the drive signals to the one of the field windings 32 and 33 for which the signal voltage of the drive signal is to be controlled to be larger than the zero voltage, while interrupting the electrical connection between the path for measuring the induced voltages and the winding.

Figure 10:
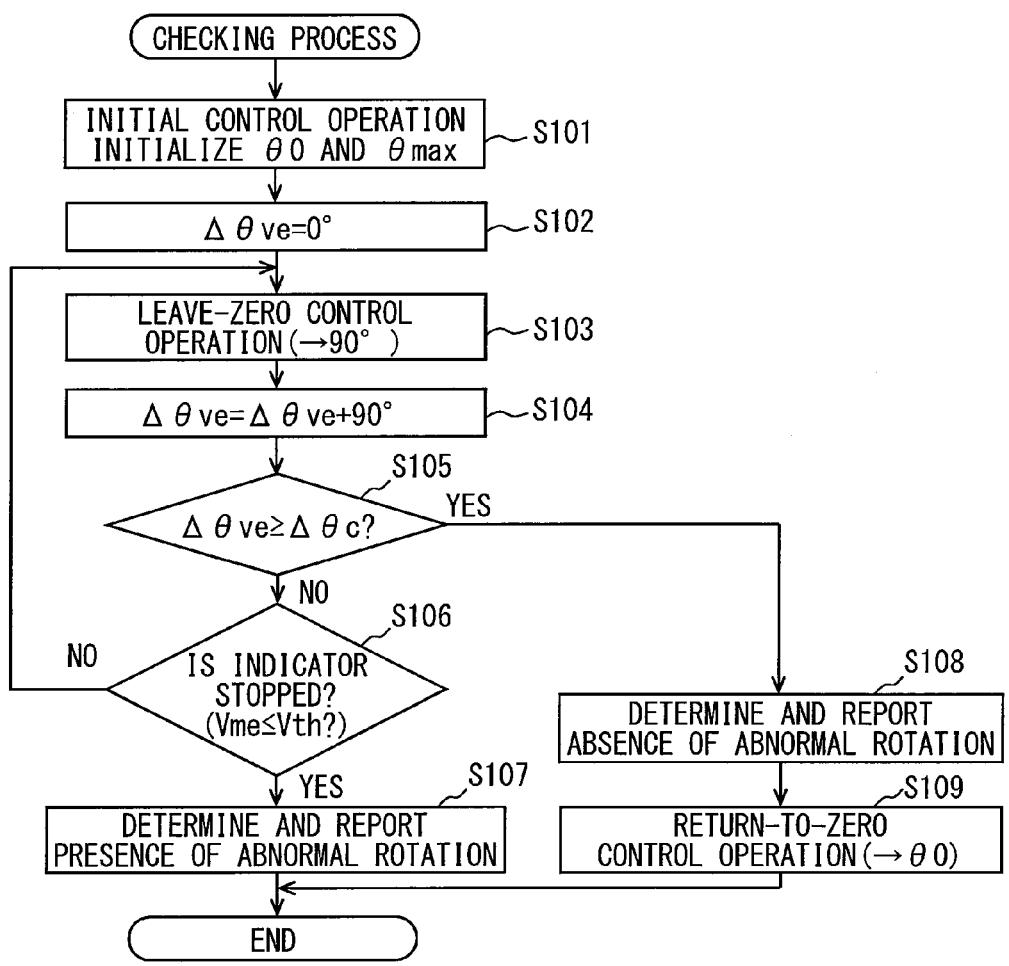
FIG. 10 is a flow chart showing the control flow of a checking process according to the first embodiment.

With such a switching function, in the present embodiment, the control unit 50 sets the electrical angles at which the A- and B-phase drive signals have the zero voltage, i.e., the zero angle θ0 and the electrical angles shifted at 90-degree intervals from the zero angle θ0, which are shown by the solid circles in FIG. 9, to measurement angles θme for the induced voltages. As a result, as shown in FIG. 10 described later in detail, when the induced voltages Vme measured at the measurement angles θme are not more than a set voltage Vth, the control unit 50 determines that the stopping of the indicator 20 is detected. Thus, the control unit 50 which detects the stopping of the indicator 20 corresponds to the "detection device".

As shown in FIG. 3, the control unit 50 is further electrically connected to the vehicle speed sensor 60 of the vehicle. In a predetermined process during the engine operation of the vehicle, the control unit 50 controls each of the A- and B-phase drive signals on the basis of the zero angle θ0 corresponding to the zero position P0 of the indicator 20 to thus sequentially indicate the detected vehicle speed values of the vehicle speed sensor 60 using the indicator 20.

(Checking Process)

Next, referring to FIG. 10, a detailed description will be given of a control flow for performing the checking process with the control unit 50. Note that the control flow is started in response to the inputting of a start instruction from a checking operator before the product shipment of the instrument 1.

First, in S101, an initial control operation of initializing the zero angle θ0 and the maximum angle θmax is performed. Specifically, induced voltages are measured at each of the measurement angles θme, while gradually adjusting the electrical angle of each of the A- and B-phase drive signals (hereinafter also referred to simply as "electrical angles") so as to rotate the indicator 20 in the leave-zero direction Y and then in the return-to-zero direction X and stop the indicator 20 at the zero position P0. At this time, the electrical angle for rotating the indicator 20 in the leave-zero-direction Y is set to be sufficiently smaller than the maximum angle θmax and set to, e.g., 273° or the like in the present embodiment so as to be smaller than the electrical angle corresponding to a lower-limit indicating position P1. As a result, when the measured induced voltages are not more than the set voltage Vth, the measurement angle θme is initialized to the zero angle θ0 on the assumption that the stopping of the indicator 20 by the stopper mechanism S has been detected. At the same time, the maximum angle θmax is initialized so as to provide the angle difference Δθc between the initialized zero angle θ0 and the maximum angle θmax. Thus, the control unit 50 which performs S101 corresponds to the "initialization device".

Next, in S102, to monitor a variation in electrical angle in a leave-zero control operation, a leave-zero-operation angle variation Δθve is set to the zero degree (0°). Subsequently, in S103, the leave-zero control operation which rotates the indicator 20 in the leave-zero direction Y is performed. Specifically, the electrical angle of each of the A- and B-phase drive signals is changed by 90° corresponding to each of the intervals between the measurement angles θme to the corresponding side in the direction Y (i.e., increase side) so as to rotate the indicator 20 from the current rotational position in the leave-zero direction Y. Subsequently, in S104, 90° is added to the leave-zero-operation angle variation Δθve.

Subsequently, in S105, it is determined whether or not the leave-zero-operation angle variation Δθve has reached the angle difference Δθc between the zero angle θ0 and the maximum angle θmax. As a result, when a negative determination is made, the process moves to S106. In S106, the induced voltages are measured and, depending on whether or not the measured voltages Vme are not more than the set voltage Vth, it is determined whether or not the stopping of the indicator 20 has been detected.

When a negative determination is made in S106, S103 and the steps subsequent thereto are performed. On the other hand, when an affirmative determination is made in S106, i.e., when it is determined that the stopping of the indicator 20 has been detected in a state where the leave-zero-operation angle variation Δθve has not reached the angle difference Δθc, the process moves to S107. As a result, an electrical angle θmee (see FIG. 12 described later in detail) which is the current measurement angle Δθme at the time of moving to S107 corresponds to the leave-zero-operation-stop detection angle θmee at the time of detecting the stopping of the indicator 20 and the current leave-zero-operation angle variation Δθve at the time of moving to S107 corresponds to the angle difference Δθve between the zero angle θ0 and the stop detection angle θmee.

In S107, the presence of abnormal rotation of the indicator 20 is determined and the occurrence of the abnormal rotation is reported to the checking operator by a warning light, voice, sound, or the like. Note that the abnormal rotation determined to be present at this time is a disorder resulting from the reception of a mechanical interference by the indicator 20, the deceleration gear mechanism G, or the step motor M, a disorder resulting from the shift between the electrical angle and the mechanical angle of the step motor M, or the like.

Thus far, the description has been given of the steps performed when a negative determination is made in S105. When an affirmative determination is made in S105, the process moves to S108. In S108, the absence of abnormal rotation of the indicator 20 is determined and reported to the checking operator by a warning light, voice, sound, or the like. Note that, subsequently in S109, a return-to-zero control operation is performed which gradually varies the electrical angle of each of the A- and B-phase drive signals to the zero angle θ0 so as to rotate the indicator 20 in the return-to-zero direction X and return the indicator 20 to the zero position P0.

As has been described heretofore, in the first embodiment, the control unit 50 which performs S102 to S106 corresponds to the "control device" and the control unit 50 which performs S102 to S108 corresponds to the "determination device".

(Operation Example)

Next, referring to FIGS. 11 and 12, a description will be given of an operation example during the checking process.

(Operation Example in Normal State)

Figure 11:
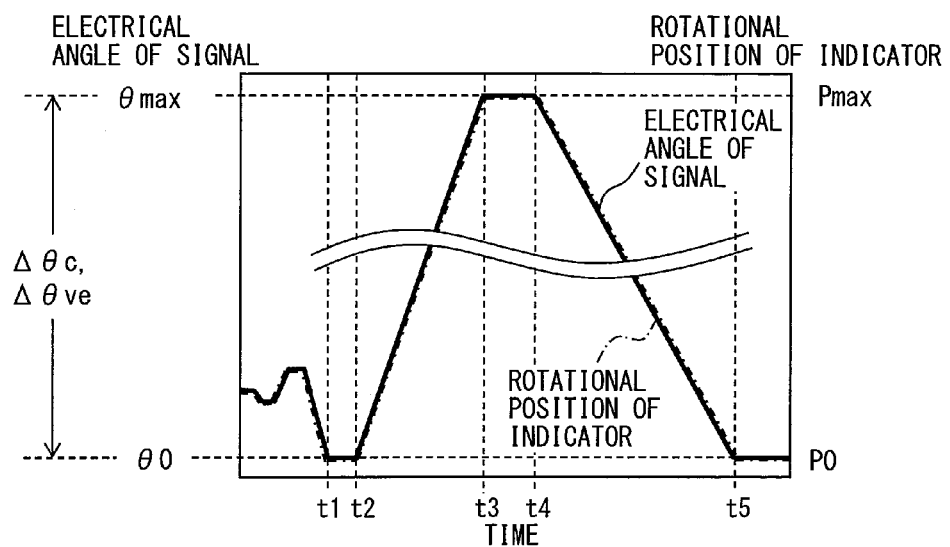
FIG. 11 is a graph showing an operation example in a normal state in the first embodiment.

FIG. 11 shows an operation example when there is no abnormal rotation of the indicator 20.

When the checking process is started, first, the indicator 20 is stopped at the zero position P0 by an initial control operation to initialize the zero angle θ0 and the maximum angle θmax (t1). Then, by the leave-zero control operation, the electrical angle is gradually varied from the zero angle θ0 to the maximum angle θmax to normally rotate the indicator 20 from the zero position P0 to the maximum position Pmax (t2 to t3). As a result, the leave-zero-operation-stop detection angle θmee at the time of detecting the stopping of the indicator 20 reaches the maximum angle θmax, i.e., the leave-zero-operation angle variation Δθve reaches the normal angle difference Δθc (t3) so that a determination of the absence of abnormal rotation is made and reported to the checking operator. Thereafter, by the return-to-zero control operation, the electrical angle is gradually varied to the zero angle θ0 to normally return the indicator 20 to the zero position P0 (t4 to t5).

(Operation Example in Abnormal State)

Figure 12:
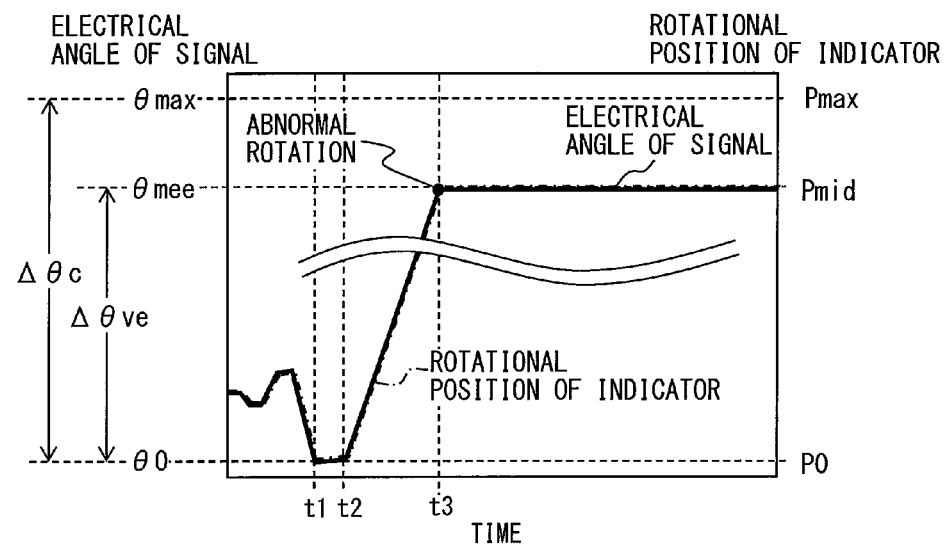
FIG. 12 is a graph showing an operation example in an abnormal state in the first embodiment.

FIG. 12 shows an operation example when abnormal rotation of the indicator 20 occurs during the leave-zero control operation.

When the checking process is started, first, the zero angle θ0 and the maximum angle θmax are initialized in the same manner as during normal rotation (t1). Then, by the leave-zero control operation, the electrical angle is gradually varied from the zero angle θ0 toward the maximum angle θmax. However, when the indicator 20 is stopped at a middle position Pmid by the reception of a mechanical interference or the like (t2 to t3), the leave-zero-operation-stop detection angle θmee at the time of detecting the stopping is smaller than the maximum angle θmax. As a result, the leave-zero-operation angle variation Δθve has not reached the normal angle difference Δθc (t3) so that a determination of the presence of abnormal rotation is made and reported to the checking operator.

(Effects)

The effects of the first embodiment described above will be described below.

According to the first embodiment, the leave-zero control operation is performed which varies the electrical angle of each of the A- and B-phase drive signals so as to rotate the indicator 20 from the zero position P0 to the maximum position Pmax. When abnormal rotation of the indicator 20 resulting from a mechanical interference or the like occurs during such a leave-zero control operation, the leave-zero-operation-stop detection angle θmee detected on the basis of the stopping of the indicator 20 by the abnormal rotation is smaller than the maximum angle θmax when the indicator 20 has been able to normally rotate to the maximum position Pmax. Therefore, during the leave-zero control operation, it is possible to automatically determine the presence or absence of the abnormal rotation on the basis of the leave-zero-operation-stop detection angle θmee at the time of detecting the stopping of the indicator 20.

Here, in the first embodiment, between the zero angle θ0 when the indicator 20 has been rotated to the zero position P0 and the maximum angle θmax when the indicator 20 has been rotated to the maximum position Pmax, the angle difference Δθc in accordance with the space between the zero position P0 and the maximum position Pmax is formed. On the other hand, between the zero angle θ0 when the indicator 20 has been rotated to the zero position P0 and the leave-zero-operation-stop detection angle θmee at the time of detecting the stopping of the indicator 20 during the leave-zero control operation, the angle difference Δθve in accordance with the presence or absence of the abnormal rotation of the indicator 20 is formed. Accordingly, at the time of abnormal rotation when the indicator 20 is stopped during the leave-zero control operation, the angle difference Δθve between the zero angle θ0 and the leave-zero-operation-stop detection angle θmee cannot reach the angle difference Δθc between the zero angle θ0 and the maximum angle θmax. Therefore, on the basis of the determination that the angle difference Δθve between the zero angle θ0 and the leave-zero-operation-stop detection angle θmee has not reached the angle difference Δθc between the zero angle θ0 and the maximum angle θmax, a precise determination of the presence of abnormal rotation can automatically be made.

Also, in the first embodiment, when the stopping of the indicator 20 that has reached the zero position P0 as a result of electrical angle adjustment by the initial control operation is detected, the zero angle θ0 is initialized on the basis of the measurement angle θme at the time of the detection and the maximum angle θmax is initialized so as to provide the angle difference Δθc described previously between the maximum angle θmax and the zero angle θ0. During the leave-zero control operation performed after such an initial control operation, the presence or absence of abnormal rotation can automatically be determined on the basis of the zero angle θ0 and the maximum angle θmax each initialized immediately before. Therefore, it is possible to enhance the preciseness of the determination.

Also, according to the first embodiment, in the configuration in which the signal voltage of each of the A- and B-phase drive signals is set to the zero voltage at each of the measurement angles θme at 90° intervals, at the measurement angle θme which provides the zero voltage, the decrease of each of the induced voltages generated by the A- and B-phase field windings 32 and 33 which results from the stopping of the indicator 20 can be identified. Therefore, by detecting the stopping of the indicator 20 on the basis of the decrease of the induced voltage to a value of not more than the set voltage Vth at the measurement angle θme which provides the zero voltage during the leave-zero control operation, it is possible to enhance the preciseness of the determination of abnormal rotation based on the leave-zero-operation-stop detection angle θmee as the measurement angle θme corresponding to the zero voltage.

Second Embodiment

Figure 13:
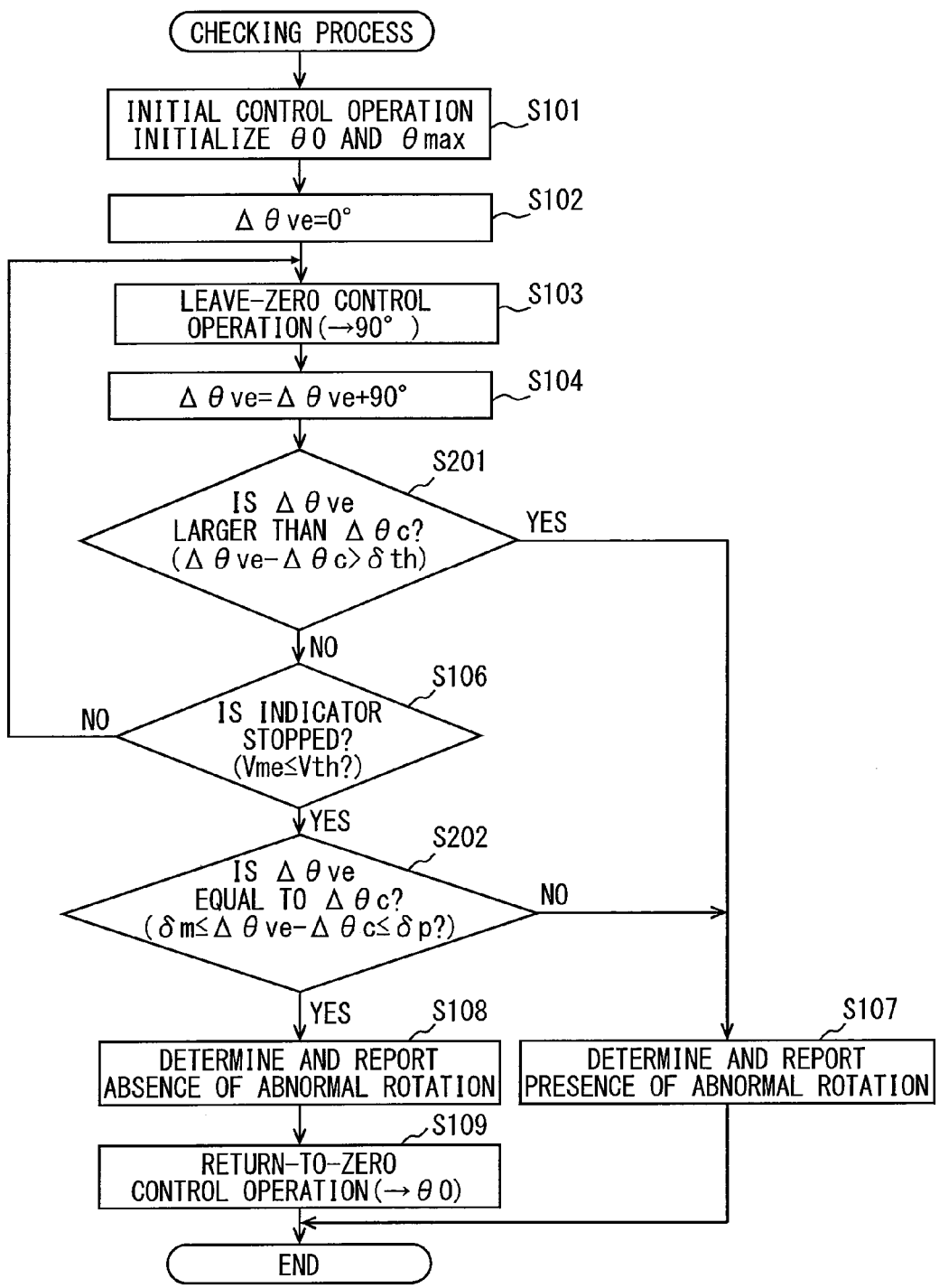
FIG. 13 is a flow chart showing the control flow of a checking process according to a second embodiment.

As shown in FIG. 13, a second embodiment of the present invention is a modification of the first embodiment.

(Checking Process)

First, a description will be given of the control flow of a checking operation according to the second embodiment. In the control flow, S105 is not performed, but S201 and S202 are performed instead.

Specifically, in S201 to which the process moves from S104, it is determined whether or not the leave-zero-operation angle variation Δθve largely exceeds the angle difference Δθc between the zero angle θ0 and the maximum angle θmax. Specifically, it is determined whether or not the difference value between Δθve and Δθc is larger than an allowable limit δth. As a result, when a negative determination is made, the process moves to S106 where it is determined whether or not there is the detected stopping of the indicator 20. Note that the allowable limit δth is set appropriately to a limit value which is allowable as an excess of the leave-zero-operation angle variation Δθve over the normal angle difference Δθc.

When a negative determination is made in S106, S103 and the steps subsequent thereto are performed. On the other hand, when an affirmative determination is made in S106, the process moves to S202. In S202, it is determined whether or not the current leave-zero-operation angle variation Δθve is equal to the angle difference θ0 between the zero angle θ0 and the maximum angle θmax within an allowable range. Specifically, when the difference value between Δθve and Δθc falls within the range of not less than a negative allowable limit θm and not more than a positive allowable limit δp, it is determined that Δθve and Δθc are equal. When the difference value between Δθve and Δθc does not fall within the range of not less than the negative allowable limit θm and not more than the positive allowable limit δp, it is determined that Δθve and Δθc are different. Thus, in the present embodiment, the electrical angle θmee as the current measurement angle θme at the time of moving to S202 corresponds to the leave-zero-operation-stop detection angle θmee, and the current leave-zero-operation angle variation Δθve at the time of moving to S202 corresponds to the angle difference Δθve between the zero angle θ0 and the stop detection angle θmee. Note that δm and δp are assumed to be equal and are set appropriately to the limit value of an allowable difference value between Δθve and Δθc.

When it is determined in S202 that Δθve and Δθc are equal, S108 and S109 are sequentially performed. On the other hand, when it is determined in S202 that Δθve and Δθc are different, S107 is performed. When an affirmative determination is made in S201 also, S107 is performed. However, the abnormal rotation determined to be present in S107 after the affirmative determination is made in S201 is a disorder resulting from the sift between the electrical angle and the mechanical angle of the step motor M or the like.

As has been described heretofore, in the second embodiment, the control unit 50 which performs S201, S102 to S104, and S106 corresponds to the "control device" and the control unit 50 which performs S202, S102 to S104 and S106 to S108 corresponds to the "determination device".

(Effects)

The effects peculiar to the second embodiment described above will be described below.

In the second embodiment also, between the zero angle θ0 when the indicator 20 has been rotated to the zero position P0 and the maximum angle θmax when the indicator 20 has been rotated to the maximum position Pmax, the angle difference Δθc in accordance with the space between the zero position P0 and the maximum position Pmax is formed. On the other hand, between the zero angle θ0 when the indicator 20 has been rotated to the zero position P0 and the leave-zero-operation-stop detection angle θmee at the time of detecting the stopping of the indicator 20 during the leave-zero control operation, the angle difference Δθve in accordance with the presence or absence of the abnormal rotation of the indicator 20 is formed. Accordingly, at the time of abnormal rotation when the indicator 20 is stopped during the leave-zero control operation before being stopped by the stopper mechanism S, the angle difference Δθve between the zero angle θ0 and the leave-zero-operation-stop detection angle θmee is smaller than the angle difference Δθc between the zero angle θ0 and the maximum angle θmax. Therefore, on the basis of the determination that the angle difference Δθve between the zero angle θ0 and the leave-zero-operation-stop detection angle θmee is different from the angle difference Δθc between the zero angle θ0 and the maximum angle θmax, a precise determination of the presence of abnormal rotation can automatically be made.

Third Embodiment

Figure 14:
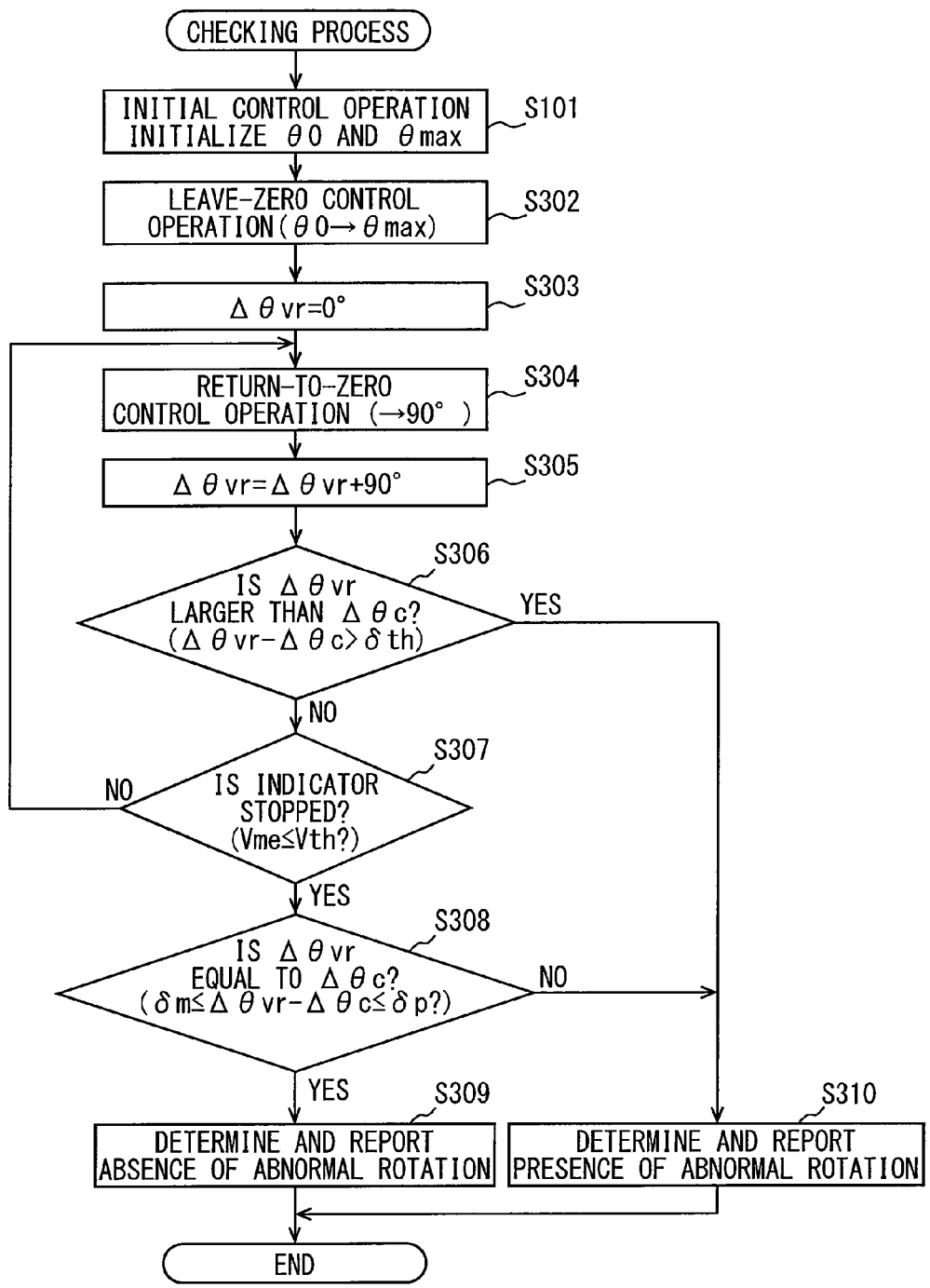
FIG. 14 is a flow chart showing the control flow of a checking process according to a third embodiment.

Referring to FIG. 14, a detailed description will be given of a control flow for performing a checking process using the control unit 50 in a third embodiment. Note that the control flow is started in response to the inputting of a start instruction from the checking operation before the product shipment of the instrument 1.

(Checking Process)

In S101, in the same manner as in the first and second embodiments, an initial control operation of initializing the zero angle θ0 and the maximum angle θmax is performed.

Next, in S302, a leave-zero control operation which rotates the indicator 20 in the leave-zero direction Y is performed. Specifically, the electrical angle of each of the A- and B-phase drive signals is gradually varied from the zero angle θ0 to the maximum angle θmax so as to rotate the indicator 20 from the zero position P0 to the maximum position Pmax.

Further, in S303, to monitor a variation in electrical angle in a subsequent return-to-zero control operation, a return-to-zero-operation angle variation Δθvr is set to a zero degree (0°). Subsequently, in S304, the return-to-zero control operation which rotates the indicator 20 in the return-to-zero direction X is performed. Specifically, the electrical angle of each of the A- and B-phase drive signals is changed by 90° corresponding to each of the intervals between the measurement angles θme to the corresponding side in the direction X (i.e., decrease side) so as to rotate the indicator 20 from the current rotational position in the return-to-zero direction X. Subsequently, in S305, 90° is added to the return-to-zero-operation angle variation Δθvr.

Subsequently, in S306, it is determined whether or not the return-to-zero-operation angle variation Δθvr largely exceeds the angle difference Δθc between the zero angle θ0 and the maximum angle θmax. Specifically, it is determined whether or not the difference value between Δθvr and Δθc is larger than the allowable limit δth. As a result, when a negative determination is made, the process moves to S307 where induced voltages are measured and, depending on whether or not the measured voltages Vme are not more than the set voltage Vth, it is determined whether or not the stopping of the indicator 20 has been detected. Note that the allowable limit δth is set appropriately to a limit value which is allowable as an excess of the return-to-zero-operation angle variation Δθvr over the normal angle difference Δθc.

When the negative determination is made in S307, S304 and the steps subsequent thereto are performed. On the other hand, when an affirmative determination is made in S307, the process moves to S308. In S308, it is determined whether or not the current return-to-zero-operation angle variation Δθvr is equal to the angle difference Δθ between the zero angle θ0 and the maximum angle θmax within an allowable range. Specifically, when the difference value between Δθvr and Δθc falls within the range of not less than the negative allowable limit δm and not more than the positive allowable limit δp, it is determined that Δθvr and Δθc are equal. When the difference value between Δθvr and Δθc does not fall within the range of not less than the negative allowable limit δm and not more than the positive allowable limit δp, it is determined that Δθvr and Δθc are different. Thus, an electrical angle θmer (see FIGS. 15 to 17 described later in detail) as the current measurement angle θme at the time of moving to S308 corresponds to the return-to-zero-operation-stop detection angle θmer at the time of detecting the stopping of the indicator 20, and the current return-to-zero-operation angle variation Δθvr at the time of moving to S308 corresponds to the angle difference Δθvr between the maximum angle θmax and the stop detection angle θmer. Note that δm and δp are assumed to be equal and are set appropriately to the limit value of an allowable difference value between Δθvr and Δθc.

When it is determined in S308 that Δθvr and Δθc are equal, the process moves to S309 where the absence of abnormal rotation of the indicator 20 is determined and reported to the checking operator by a warning light, voice, sound, or the like. On the other hand, when it is determined in S308 that Δθvr and Δθc are different, the process moves to S310 where the presence of abnormal rotation of the indicator 20 is determined and the occurrence of the abnormal rotation is reported to the checking operator by a warning light, voice, sound, or the like. Note that the abnormal rotation determined to be present at this time is a disorder resulting from the reception of a mechanical interference (e.g., engagement) by the indicator 20, the deceleration gear mechanism G, or the step motor M, a disorder resulting from the shift between the electrical angle and the mechanical angle of the step motor M, or the like.

Thus, the description has been given of the steps performed when the negative determination is made in S306. However, even when an affirmative determination is made in S306 also, the process moves to S310. However, the abnormal rotation determined to be present at this time is a disorder resulting from the shift between the electrical angle and the mechanical angle of the step motor M or the like.

As has been described heretofore, in the third embodiment, the control unit 50 which performs S302 to S307 corresponds to the "control device" and the control unit 50 which performs S303 to S305 and S307 to S310 corresponds to the "determination device".

(Operation Example)

Next, referring to FIGS. 15 to 17, a description will be given of an operation example during the checking process.

(Operation Example in Normal State)

Figure 15:
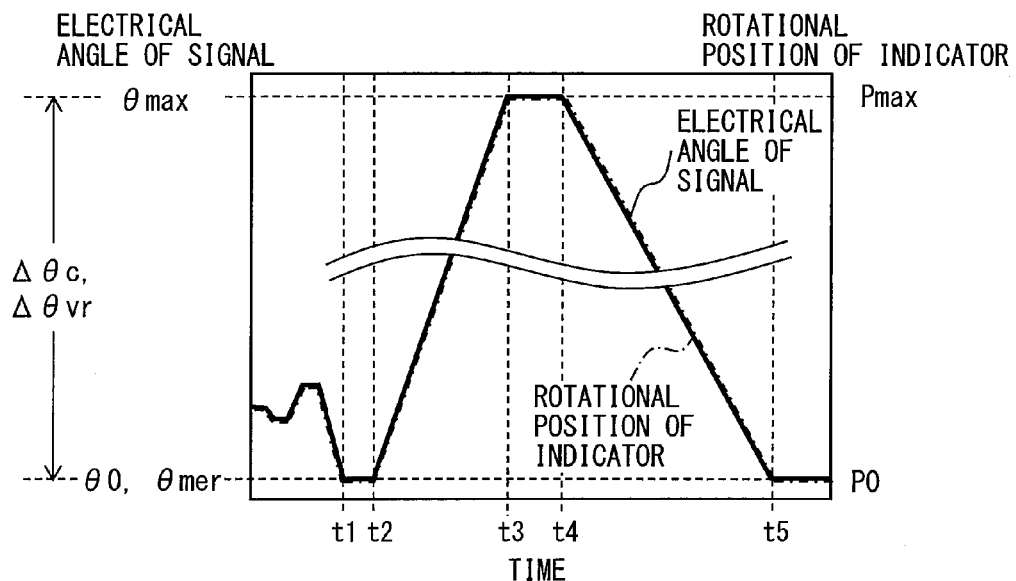
FIG. 15 is a graph showing an operation example in a normal state in the third embodiment.

FIG. 15 shows an operation example when there is no abnormal rotation of the indicator 20.

When the checking process is started, first, the indicator 20 is stopped at the zero position P0 by an initial control operation to initialize the zero angle θ0 and the maximum angle θmax (t1). Then, by the leave-zero control operation, the electrical angle is gradually varied from the zero angle θ0 to the maximum angle θmax to normally rotate the indicator 20 from the zero position P0 to the maximum position Pmax (t2 to t3). Subsequently, the electrical angle is gradually varied from the maximum angle θmax to the zero angle θ0 by the return-to-zero control operation to normally rotate the indicator 20 from the maximum position Pmax to the zero position P0 (t4 to t5). As a result, the return-to-zero-operation-stop detection angle θmer at the time of detecting the stopping of the indicator 20 is substantially equal to the zero angle θ0 so that the return-to-zero-operation angle variation Δθvr and the normal angle difference Δθc are equal in an allowable range (t5). Therefore, a determination of the absence of abnormal rotation is made and reported to the checking operator.

(Operation Example in Abnormal Leave-Zero State)

Figure 16:
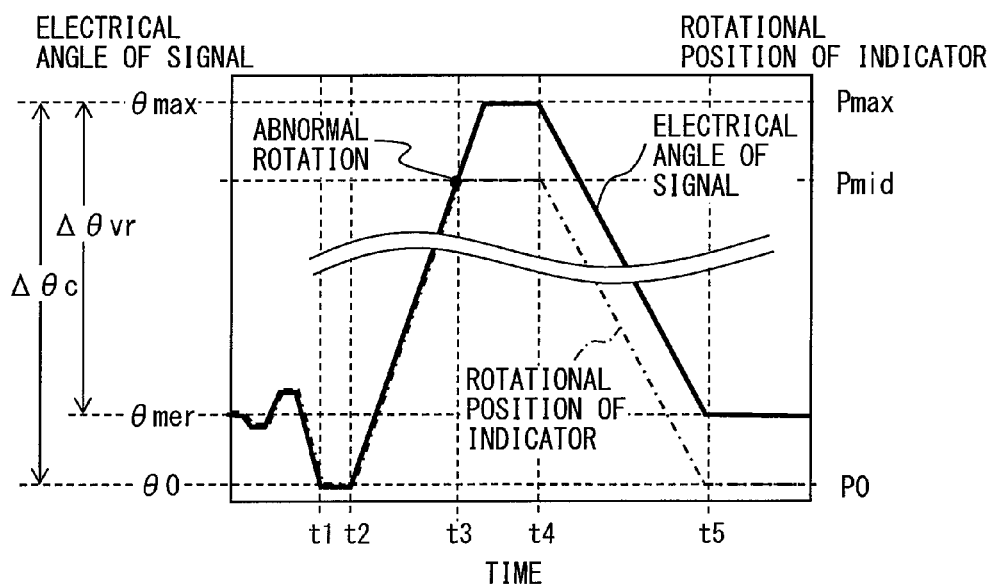
FIG. 16 is a graph showing an operation example in an abnormal leave-zero state in the third embodiment.

FIG. 16 shows an operation example when abnormal rotation of the indicator 20 occurs during the leave-zero control operation.

When the checking process is started, first, the zero angle θ0 and the maximum angle θmax are initialized in the same manner as during the normal rotation (t1). Then, by the leave-zero control operation, the electrical angle is gradually varied from the zero angle θ0 to the maximum angle θmax. However, when the indicator 20 is stopped at the middle position Pmid between the zero position P0 and the maximum position Pmax by the reception of a mechanical interference or the like (t2 to t3), a shift occurs between the rotational position (Pmid) of the indicator and the electrical angle (θmax). Thereafter, by the return-to-zero control operation, the electrical angle is gradually varied from the maximum angle θmax to rotate the indicator 20 from the middle position Pmid to the zero position P0 (t4 to t5). As a result, the return-to-zero-operation-stop detection angle θmer at the time of detecting the stopping of the indicator 20 is larger than the zero angle θ0 so that the return-to-zero-operation angle variation Δθvr is smaller than the normal angle difference Δθc (t5). Therefore, a determination of the presence of abnormal rotation is made and reported to the checking operator.

(Operation Example in Abnormal Return-To-Zero State)

Figure 17:
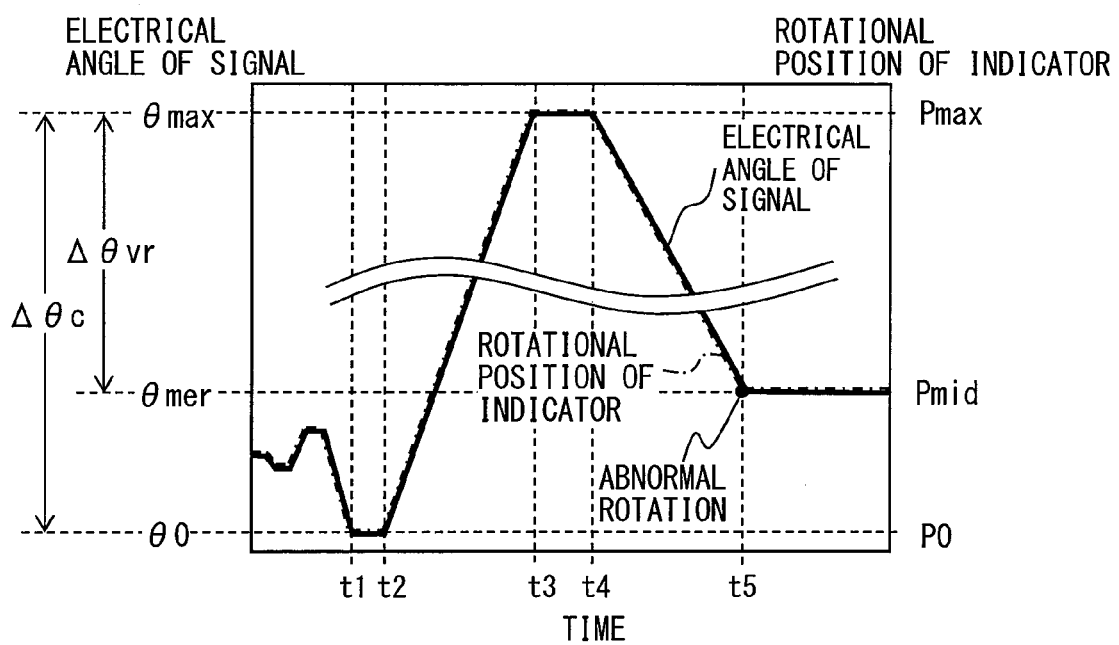
FIG. 17 is a graph showing an operation example in an abnormal return-to-zero state in the third embodiment.

FIG. 17 shows an operation example when abnormal rotation of the indicator 20 occurs during the return-to-zero control operation.

When the checking process is started, first, the zero angle θ0 and the maximum angle θmax are initialized in the same manner as during the normal rotation (t1). Then, in the same manner as during the normal rotation, the indicator 20 rotates from the zero position P0 to the maximum position Pmax (t2 to t3). Subsequently, by the return-to-zero control operation, the electrical angle is gradually varied from the maximum angle θmax but, when the indicator 20 is stopped at the middle position Pmid by the reception of a mechanical interference or the like (t4 to t5), the return-to-zero-operation-stop detection angle θmer at the time of detecting the stopping is larger than the zero angle θ0. As a result, the return-to-zero-operation angle variation Δθvr is smaller than the normal angle difference Δθc (t5) so that a determination of the presence of abnormal rotation is made and reported to the checking operator.

(Effects)

The effects of the third embodiment described above will be described below.

According to the third embodiment, after the leave-zero control operation which varies the electrical angle of each of the A- and B-phase drive signals so as to rotate the indicator 20 from the zero position P0 to the maximum position Pmax, the return-to-zero control operation is performed which varies the electrical angle so as to rotate the indicator 20 from the maximum position Pmax to the zero position P0. When abnormal rotation of the indicator 20 resulting from a mechanical interference or the like occurs during the leave-zero control operation, a shift occurs between the rotational position of the indicator 20 and the electrical angle. Accordingly, the return-to-zero-operation-stop detection angle θmer when the stopping of the indicator 20 by the stopper mechanism S is detected during the subsequent return-to-zero control operation is different from the normal zero angle θ0. On the other hand, when abnormal rotation of the indicator 20 resulting from a mechanical interference or the like occurs during the return-to-zero control operation, the indicator 20 is stopped by the abnormal rotation before being stopped by the stopper mechanism S so that the detected return-to-zero-operation-stop detection angle θmer is different from the normal zero angle θ0. Therefore, during both of the leave-zero control operation and the return-to-zero control operation, on the basis of the return-to-zero-operation-stop detection angle θmer at the time of detecting the stopping of the indicator 20, the presence or absence of the abnormal rotation can automatically be determined.

Between the zero angle θ0 when the indicator 20 has been rotated to the zero position P0 and the maximum angle θmax when the indicator 20 has been rotated to the maximum position Pmax, the angle difference Δθc in accordance with the space between the zero position P0 and the maximum position Pmax is formed. On the other hand, between the return-to-zero-operation-stop detection angle θmer at the time of detecting the stopping of the indicator 20 during the return-to-zero control operation and the maximum angle θmax when the indicator 20 has been rotated to the maximum position Pmax, the angle difference Δθvr in accordance with the presence or absence of the abnormal rotation of the indicator 20 is formed. Accordingly, at the time of either the abnormal rotation during the leave-zero control operation or the abnormal rotation during the return-to-zero control operation when the indicator 20 is stopped, the angle difference Δθvr between the return-to-zero-operation-stop detection angle θmer and the maximum angle θmax is smaller than the angle difference Δθc between the zero angle θ0 as the normal return-to-zero-operation-stop detection angle θmer and the maximum angle θmax. Therefore, on the basis of the determination that the angle difference Δθvr between the return-to-zero-operation-stop detection angle θmer and the maximum angle θmax is different from the angle difference Δθc between the zero angle θ0 and the maximum angle θmax, a precise determination of the presence of abnormal rotation can automatically be made.

Also, in the third embodiment, when the stopping of the indicator 20 that has reached the zero position P0 as a result of electrical angle adjustment by the initial control operation is detected, the zero angle θ0 is initialized on the basis of the measurement angle θme at the time of the detection and the maximum angle θmax is initialized so as to provide the angle difference Δθc described previously between the maximum angle θmax and the zero angle θ0. During each of the leave-zero control operation and the return-to-zero control operation which are sequentially performed after such an initial control operation, the presence or absence of abnormal rotation can automatically be determined on the basis of the zero angle θ0 and the maximum angle θmax each initialized immediately before. Therefore, it is possible to enhance the preciseness of the determination.

Also, according to the third embodiment, in the configuration in which the signal voltage of each of the A- and B-phase drive signals is set to the zero voltage at each of the measurement angles θme at 90° intervals, at the measurement angle θme which provides the zero voltage, the decrease of each of the induced voltage generated in the A- and B-phase field windings 32 and 33 which results from the stopping of the indicator 20 can be identified. Therefore, by detecting the stopping of the indicator 20 on the basis of the decrease of the induced voltage to a value of not more than the set voltage Vth at the measurement angle θme which provides the zero voltage during the return-to-zero control operation, it is possible to enhance the preciseness of the determination of abnormal rotation based on the return-tozero-operation-stop detection angle θmer as the measurement angle θme corresponding to the zero voltage.

Fourth Embodiment

Figure 18:
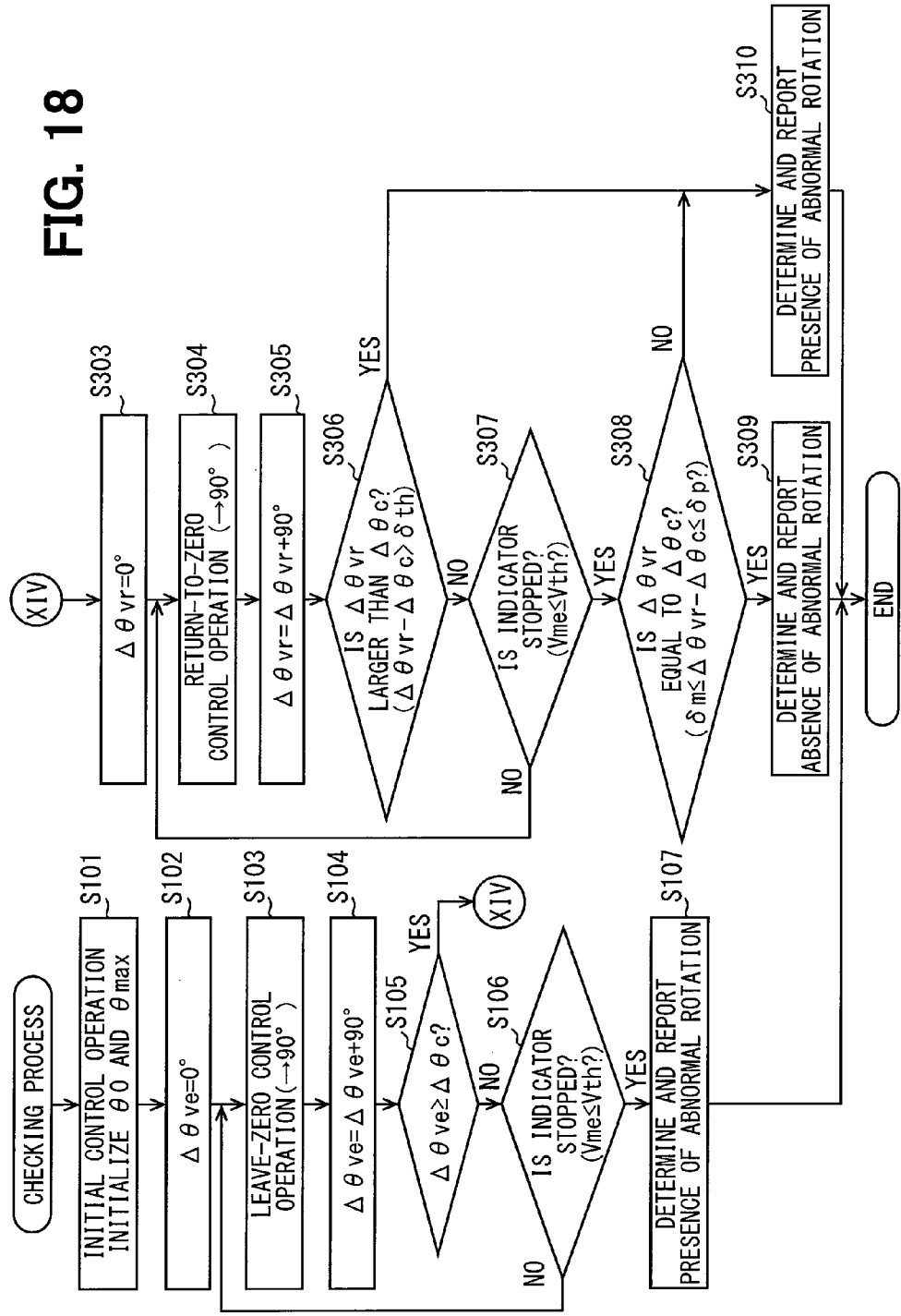
FIG. 18 is a flow chart showing the control flow of a checking process according to a fourth embodiment.

As shown in FIG. 18, a fourth embodiment of the present invention is a modification of the third embodiment.

(Checking Process)

In the control flow of the checking process in the fourth embodiment, instead of S302, S102 to S107 are performed. In this case, S102 to S107 are performed similarly to S102 to S107 in the first embodiment shown in FIG. 10.

In the fourth embodiment, when an affirmative determination is made in S105, S303 and the steps subsequent thereto are performed in the same manner as in the third embodiment. As has been described heretofore, in the fourth embodiment, the control unit 50 which performs S102 to S106 and S303 to S307 corresponds to the "control device", and the control unit 50 which performs S102 to S107, S303 to S305, and S307 to S310 corresponds to the "determination device".

(Operation Example in Abnormal Leave-Zero State)

In the present embodiment, an operation example when abnormal rotation of the indicator 20 occurs during the leave-zero control operation is the same as described in the first embodiment using FIG. 12.

(Effects)

The function/effect peculiar to the fourth embodiment described above will be described below.

According to the fourth embodiment, when abnormal rotation of the indicator 20 resulting from a mechanical interference or the like occurs during the leave-zero control operation, the leave-zero-operation-stop detection angle θmee detected on the basis of the stopping of the indicator 20 by the abnormal rotation is smaller than the maximum angle θmax when the indicator 20 has been able to normally rotate to the maximum position Pmax. Therefore, during the leave-zero control operation, in the same manner as in the first embodiment, it is possible to automatically determine the presence or absence of the abnormal rotation on the basis of the leave-zero-operation-stop detection angle θmee at the time of detecting the stopping of the indicator 20 without waiting for the return-to-zero control operation.

Here, in the fourth embodiment also, between the zero angle θ0 when the indicator 20 has been rotated to the zero position P0 and the maximum angle θmax when the indicator 20 has been rotated to the maximum position Pmax, the angle difference Δθc in accordance with the space between the zero position P0 and the maximum position Pmax is formed. On the other hand, between the zero angle θ0 when the indicator 20 has been rotated to the zero position P0 and the leave-zero-operation-stop detection angle θmee at the time of detecting the stopping of the indicator 20 during the leave-zero control operation, the angle difference Δθve in accordance with the presence or absence of the abnormal rotation of the indicator 20 is formed. Accordingly, at the time of abnormal rotation when the indicator 20 is stopped during the leave-zero control operation, the angle difference Δθve between the zero angle θ0 and the leave-zero-operation-stop detection angle θmee is smaller than the angle difference Δθc between the zero angle θ0 and the maximum angle θmax. Therefore, on the basis of the determination that the angle difference Δθve between the zero angle θ0 and the leave-zero-operation-stop detection angle θmee is different from the angle difference Δθc between the zero angle θ0 and the maximum angle θmax, a precise determination of the presence of abnormal rotation can automatically be made.

Also, in the fourth embodiment, at the measurement angle θme which provides the zero voltage during the leave-zero control operation, the stopping of the indicator 20 is detected on the basis of the decrease of each of the induced voltages to a level of not more than the set voltage Vth. As a result, it is possible to enhance the preciseness of the determination of abnormal rotation based on the leave-zero-operation-stop detection angle θmee as the measurement angle θme corresponding to the zero voltage.

Other Embodiments

Thus, the description has been given of the plurality of the embodiments of the present invention. However, the present invention should not to be construed by being limited to the embodiments thereof and can be applied to various embodiments and a combination thereof within the scope not departing from the gist thereof.

Specifically, as Modification 1 of each of the first to fourth embodiments, any value related to the various states of the vehicle such as, e.g., a fuel level, a cooling water temperature, or an engine rotation number may be indicated as a vehicle state value by the indicator 20. Also, as Modification 2 of each of the first to fourth embodiments, any drive signal having a signal voltage which varies in accordance with an electrical angle, e.g., a drive signal which varies in a trapezoidal wave form, a triangular wave form, or the like may be used. Also, as Modification 3 of each of the first and fourth embodiments, a stopper mechanism S which stops the indicator 20 by being directly engaged therewith may be used. Also, as Modification 4 of each of the first and second embodiments, the rotating internal mechanism 30 which directly transmits the rotation of the step motor M to the indicator 20 may be used without providing the deceleration gear mechanism G.

Figure 19:
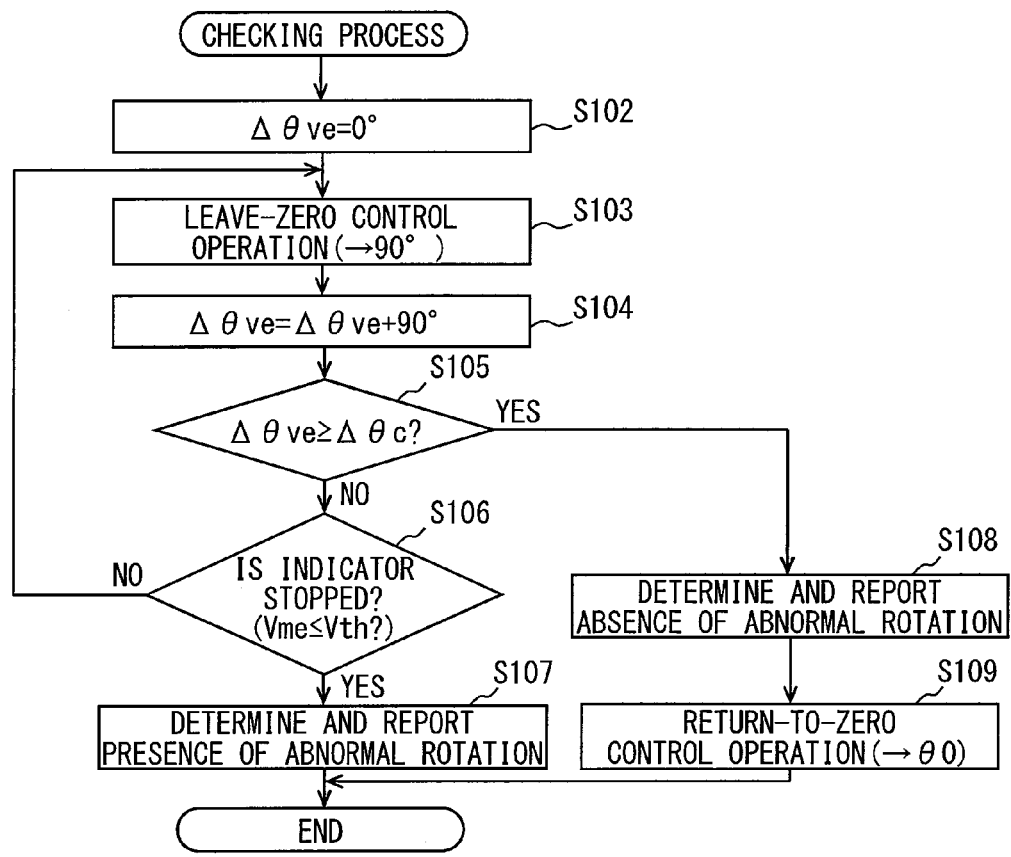
FIG. 19 is a flow chart showing the control flow of a checking process according to a modification of the first embodiment.
Figure 20:
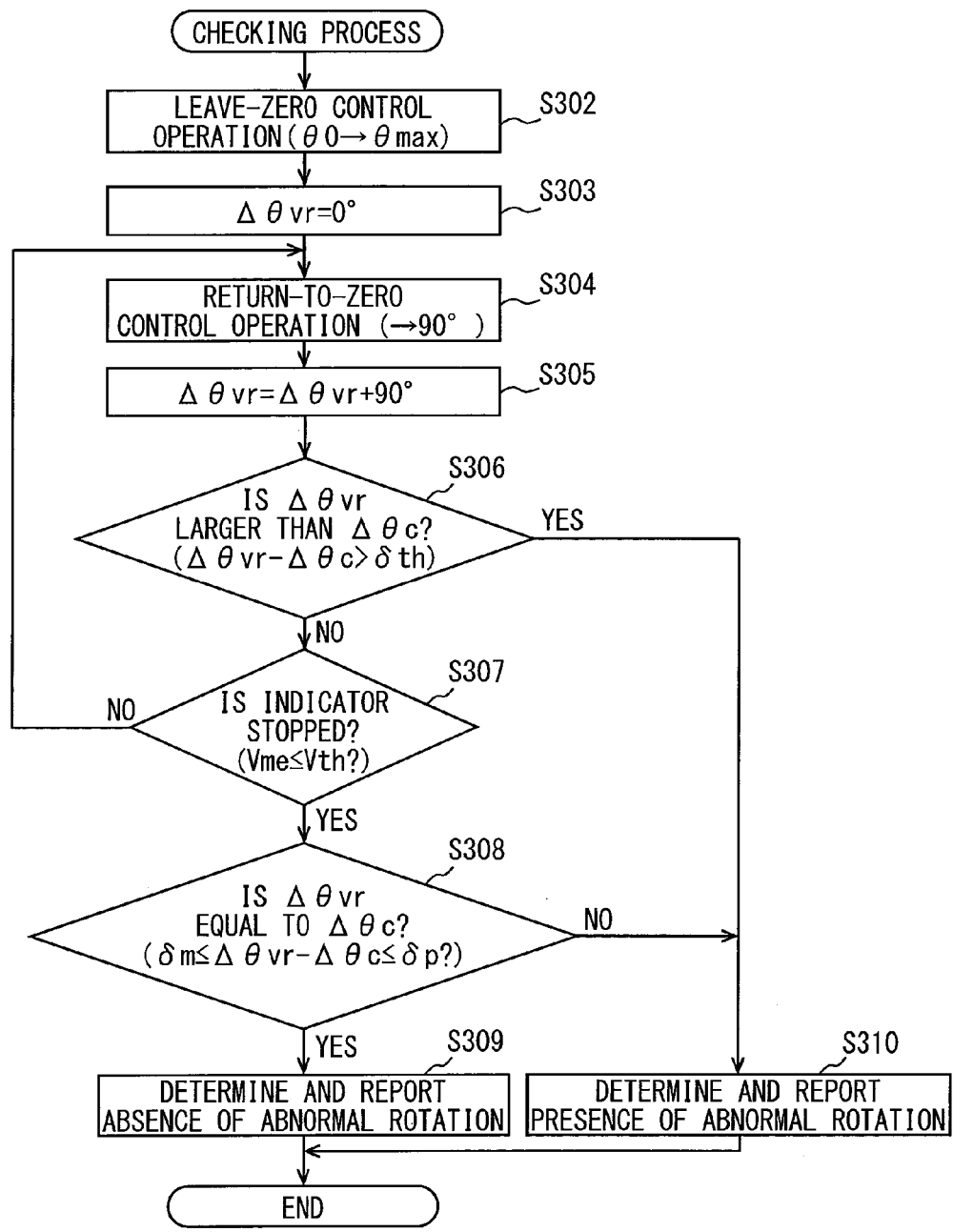
FIG. 20 is a flow chart showing the control flow of a checking process according to a modification of the third embodiment.

As Modification 5 of each of the first and fourth embodiments, when the leave-zero-operation-stop detection angle θmee at the time of detecting the stopping of the indicator 20 has not reached the normal maximum angle θmax as a result of being directly compared to the maximum angle θmax, a determination of the presence of abnormal rotation may be made. Likewise, as a modification of each of the third and fourth embodiments, when the return-to-zero-operation-stop detection angle θmer at the time of detecting the stopping of the indicator 20 is different from the normal zero angle θ0 as a result of being directly compared to θ0, a determination of the presence of abnormal rotation may be made. Also, as Modification 6 of each of the second and fourth embodiments, when the leave-zero-operation-stop detection angle θmee at the time of detecting the stopping of the indicator 20 is different from the normal maximum angle θmax as a result of being directly compared to θmax, a determination of the presence of abnormal rotation may be made. Also, as Modification 7 of each of the first to fourth embodiments, the checking process which uses the zero angle θ0 and the maximum angle θmax that have been set in advance may be performed without performing the initial control operation in S101, as shown in FIG. 19 (showing the modification of the first embodiment) and FIG. 20 (showing the modification of the third embodiment). Also, as Modification 8 of each of the first to fourth embodiments, the maximum position Pmax within a predetermined range (including also the upper-limit indicating position Pu) extending from the upper-limit indicating position Pu in the leave-zero direction Y may also be set at, e.g., the maximum rotational position of the step motor M or the like without providing the leave-zero-operation stopper member 39b.

In each of the first to fourth embodiments, the detection of the stopping of the indicator 20 need not necessarily be based on the induced voltages measured at each of the electrical angles at predetermined intervals (measurement angles θme at 90° intervals in the first and second embodiments). Instead, e.g., Modification 9 based on the result of image sensing by a camera or Modification 10 based on the result of measuring vibration or sound may also be used. Also, the checking process in each of the first and second embodiments need not necessarily be performed before the shipment of the product. Instead, e.g., Modification 11 which performs the checking process during the repair of the product or Modification 12 which performs the checking process during a predetermined process such as the activation of the instrument 1 may also be used.

As Modification 13 of the fourth embodiment, instead of S105, S201 and S202 may also be performed in the same manner as in the second embodiment shown in FIG. 13. In this case also, the same effect as can be obtained from the second embodiment can be obtained.

What is claimed is:

1. An indicating instrument for a vehicle, comprising:
   an indicator that indicates a vehicle state value in accordance with a rotational position between a zero position and a maximum position;
   a step motor that has a field winding and rotationally drives the indicator on application of a drive signal in accordance with an electrical angle to the field winding;
   a control device that controls the electrical angle of the drive signal applied to the field winding and performs a leave-zero control operation which varies the electrical angle so as to rotate the indicator from the zero position toward the maximum position;
   a detection device that detects stopping of the indicator; and
   a determination device that determines presence or absence of abnormal rotation of the indicator on the basis of the electrical angle when the detection device has detected the stopping of the indicator during the leave-zero control operation;
   wherein the electrical angle when the indicator has been rotated to the zero position is defined as a zero angle, the electrical angle when the indicator has been rotated to the maximum position is defined as a maximum angle, and the electrical angle when the detection device has detected the stopping of the indicator during the leave-zero control operation is defined as a leave-zero-operation-stop detection angle, and
   wherein, on determining that an angle difference between the zero angle and the leave-zero-operation-stop detection angle has not reached an angle difference between the zero angle and the maximum angle, the determination device determines the presence of the abnormal rotation.

2. The indicating instrument for a vehicle according to claim 1,
   wherein the control device performs an initial control operation which adjusts the electrical angle so as to stop the indicator at the zero position and then performs the leave-zero control operation,
   the indicating instrument for a vehicle further comprising:
   an initialization device that initializes, when the detection device has detected the stopping of the indicator due to the initial control operation, the zero angle on the basis of the electrical angle at the time of the detection and also initializes the maximum angle so as to provide, between the maximum angle and the zero angle, an angle difference in accordance with a space between the zero position and the maximum position.

3. An indicating instrument for a vehicle, comprising:
   an indicator that indicates a vehicle state value in accordance with a rotational position between a zero position and a maximum position;
   a step motor that has a field winding and rotationally drives the indicator on application of a drive signal in accordance with an electrical angle to the field winding;
   a control device that controls the electrical angle of the drive signal applied to the field winding and performs a leave-zero control operation which varies the electrical angle so as to rotate the indicator from the zero position toward the maximum position;
   a detection device that detects stopping of the indicator;
   a determination device that determines presence or absence of abnormal rotation of the indicator on the basis of the electrical angle when the detection device has detected the stopping of the indicator during the leave-zero control operation;
   a stopper mechanism that stops the indicator at the maximum position,
   wherein the electrical angle when the indicator has been rotated to the zero position is defined as a zero angle, the electrical angle when the indicator has been rotated to the maximum position is defined as a maximum angle, and the electrical angle when the detection device has detected the stopping of the indicator during the leave-zero control operation is defined as a leave-zero-operation-stop detection angle, and
   wherein, on determining that an angle difference between the zero angle and the leave-zero-operation-stop detection angle is different from an angle difference between the zero angle and the maximum angle, the determination device determines the presence of the abnormal rotation.

4. An indicating instrument for a vehicle, comprising:
   an indicator that indicates a vehicle state value in accordance with a rotational position between a zero position and a maximum position;
   a step motor that has a field winding and rotationally drives the indicator on application of a drive signal in accordance with an electrical angle to the field winding;
   a stopper mechanism that stops the indicator at the zero position;
   a control device that controls the electrical angle of the drive signal applied to the field winding, performs a leave-zero control operation which varies the electrical angle so as to rotate the indicator from the zero position to the maximum position, and then performs a return-to-zero control operation which varies the electrical angle so as to rotate the indicator from the maximum position toward the zero position;
   a detection device that detects stopping of the indicator; and
   a determination device that determines presence or absence of abnormal rotation of the indicator on the basis of the electrical angle when the detection device has detected the stopping of the indicator during the return-to-zero control operation.

5. The indicating instrument for a vehicle according to claim 4,
   wherein the electrical angle when the indicator has been rotated to the zero position is defined as a zero angle, the electrical angle when the indicator has been rotated to the maximum position is defined as a maximum angle, and the electrical angle when the detection device has detected the stopping of the indicator during the return-to-zero control operation is defined as a return-to-zero-operation-stop detection angle, and wherein, on determining that an angle difference between the return-to-zero-operation-stop detection angle and the maximum angle is different from an angle difference between the zero angle and the maximum angle, the determination device determines the presence of the abnormal rotation.

6. The indicating instrument for a vehicle according to claim 5, wherein the control device performs an initial control operation which adjusts the electrical angle so as to stop the indicator at the zero position and then successively performs the leave-zero control operation and the return-to-zero control operation, the indicating instrument for a vehicle further comprising:

an initialization device that initializes, when the detection device has detected the stopping of the indicator due to the initial control operation, the zero angle on the basis of the electrical angle at the time of the detection and also initializes the maximum angle so as to provide, between the maximum angle and the zero angle, an angle difference in accordance with a space between the zero position and the maximum position.

7. The indicating instrument for a vehicle according to claim 4, wherein the determination device determines the presence or absence of the abnormal rotation of the indicator on the basis of the electrical angle when the detection device has detected the stopping of the indicator during the leave-zero control operation.

8. The indicating instrument for a vehicle according to claim 7, wherein the electrical angle when the indicator has been rotated to the zero position is defined as a zero angle, the electrical angle when the indicator has been rotated to the maximum position is defined as a maximum angle, and the electrical angle when the detection device has detected the stopping of the indicator during the leave-zero control operation is defined as a leave-zero-operation-stop detection angle, and wherein, on determining that an angle difference between the zero angle and the leave-zero-operation-stop detection angle is different from the angle difference between the zero angle and the maximum angle, the determination device determines the presence of the abnormal rotation.

9. The indicating instrument for a vehicle according to claim 4, wherein the control device sets a signal voltage of the drive signal to a zero voltage at each of the electrical angles at a predetermined interval, and wherein the detection device detects the stopping of the indicator on the basis of decrease of an induced voltage generated in the field winding to a level of not more than a set voltage at the electrical angle which provides the zero voltage.

10. An indicating instrument for a vehicle, comprising:

an indicator that indicates a vehicle state value in accordance with a rotational position between a zero position and a maximum position;

a step motor that has a field winding and rotationally drives the indicator on application of a drive signal in accordance with an electrical angle to the field winding;

a control device that controls the electrical angle of the drive signal applied to the field winding and performs a leave-zero control operation which varies the electrical angle so as to rotate the indicator from the zero position toward the maximum position;

a detection device that detects stopping of the indicator; and a determination device that determines presence or absence of abnormal rotation of the indicator on the basis of the electrical angle when the detection device has detected the stopping of the indicator during the leave-zero control operation, wherein the control device sets a signal voltage of the drive signal to a zero voltage at each of the electrical angles at a predetermined interval, and wherein the detection device detects the stopping of the indicator on the basis of decrease of an induced voltage generated in the field winding to a level of not more than a set voltage at the electrical angle which provides the zero voltage.

11. The indicating instrument for a vehicle according to claim 10, wherein the electrical angle when the indicator has been rotated to the zero position is defined as a zero angle, the electrical angle when the indicator has been rotated to the maximum position is defined as a maximum angle, and the electrical angle when the detection device has detected the stopping of the indicator during the leave-zero control operation is defined as a leave-zero-operation-stop detection angle, and wherein, on determining that an angle difference between the zero angle and the leave-zero-operation-stop detection angle has not reached an angle difference between the zero angle and the maximum angle, the determination device determines the presence of the abnormal rotation.

12. The indicating instrument for a vehicle according to claim 11, wherein the control device performs an initial control operation which adjusts the electrical angle so as to stop the indicator at the zero position and then performs the leave-zero control operation, the indicating instrument for a vehicle further comprising:

an initialization device that initializes, when the detection device has detected the stopping of the indicator due to the initial control operation, the zero angle on the basis of the electrical angle at the time of the detection and also initializes the maximum angle so as to provide, between the maximum angle and the zero angle, an angle difference in accordance with a space between the zero position and the maximum position.

13. The indicating instrument for a vehicle according to claim 10, further comprising:

a stopper mechanism that stops the indicator at the maximum position, wherein the electrical angle when the indicator has been rotated to the zero position is defined as a zero angle, the electrical angle when the indicator has been rotated to the maximum position is defined as a maximum angle, and the electrical angle when the detection device has detected the stopping of the indicator during the leave-zero control operation is defined as a leave-zero-operation-stop detection angle, and wherein, on determining that an angle difference between the zero angle and the leave-zero-operation-stop detection angle is different from an angle difference between the zero angle and the maximum angle, the determination device determines the presence of the abnormal rotation.

\* \* \* \* \*